United States Patent
Zhao

(10) Patent No.: US 11,130,706 B2
(45) Date of Patent: *Sep. 28, 2021

(54) METHODS FOR MANUFACTURING TEMPERED VACUUM GLASS AND PRODUCTION LINES THEREFOR

(71) Applicant: LUOYANG LANDGLASS TECHNOLOGY CO., LTD., Luoyang (CN)

(72) Inventor: Yan Zhao, Louyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 409 days.

This patent is subject to a terminal disclaimer.

(21) Appl. No.: 16/061,756

(22) PCT Filed: Aug. 16, 2016

(86) PCT No.: PCT/CN2016/095523
§ 371 (c)(1),
(2) Date: Jun. 13, 2018

(87) PCT Pub. No.: WO2017/101480
PCT Pub. Date: Jun. 22, 2017

(65) Prior Publication Data
US 2018/0362401 A1 Dec. 20, 2018

(30) Foreign Application Priority Data
Dec. 15, 2015 (CN) .......................... 201510940006.1

(51) Int. Cl.
*C03C 17/06* (2006.01)
*C03B 23/24* (2006.01)
(Continued)

(52) U.S. Cl.
CPC .............. *C03C 27/08* (2013.01); *B23K 1/002* (2013.01); *B23K 1/0008* (2013.01);
(Continued)

(58) Field of Classification Search
CPC ....... C03C 17/06; C03B 23/24; C03B 23/245; C03B 23/203
See application file for complete search history.

(56) References Cited

U.S. PATENT DOCUMENTS 3,916,042 A * 10/1975 Grietens .................. B23K 1/20
427/269
2009/0151855 A1* 6/2009 Wang ...................... C03C 27/06
156/109

(Continued)

*Primary Examiner* — Cynthia Szewczyk
(74) *Attorney, Agent, or Firm* — Morgan, Lewis & Bockius LLP

(57) ABSTRACT

The disclosure discloses a manufacturing method of tempered vacuum glass, comprising the following steps: (1) manufacturing metalized layers, and performing tempering or thermal enhancement on the glass substrates; (2) placing a metal solder on the metalized layers; (3) superposing the glass substrates to form a tempered glass assembly; (4) heating the tempered glass assembly to 60-230° C.; (5) keeping the tempered glass assembly within the heating temperature range of step (4) in a vacuum chamber, and vacuumizing the vacuum chamber to a preset vacuum degree; and (6) hermetically sealing the metalized layers by adopting a metal brazing process. By adopting the manufacturing method of the disclosure, the stress when the two glass substrates are sealed can be greatly reduced, and the connection strength can be increased; moreover, when gas is exhausted within the temperature range, the exhaust efficiency is high, and the exhaust effect is better, vacuum glass with high vacuum degree can be obtained, and the service life of the vacuum glass is prolonged. The disclosure further (Continued)

discloses a tempered vacuum glass production line based on the above mentioned manufacturing method.

17 Claims, 14 Drawing Sheets

(51) Int. Cl.
| | |
|---|---|
| *C03C 27/08* | (2006.01) |
| *E06B 3/66* | (2006.01) |
| *E06B 3/673* | (2006.01) |
| *E06B 3/677* | (2006.01) |
| *B23K 1/00* | (2006.01) |
| *B23K 1/002* | (2006.01) |
| *B23K 1/005* | (2006.01) |
| *B23K 3/08* | (2006.01) |
| *E06B 3/663* | (2006.01) |
| *B23K 103/00* | (2006.01) |

(52) U.S. Cl.
CPC ............ *B23K 1/0056* (2013.01); *B23K 3/087* (2013.01); *E06B 3/6612* (2013.01); *E06B 3/673* (2013.01); *E06B 3/677* (2013.01); *E06B 3/6736* (2013.01); *E06B 3/6775* (2013.01); *B23K 2103/54* (2018.08); *C03C 2203/10* (2013.01); *E06B 3/66333* (2013.01); *E06B 3/67334* (2013.01); *Y02P 40/57* (2015.11)

(56) References Cited

U.S. PATENT DOCUMENTS

| | | | | |
|---|---|---|---|---|
| 2013/0291599 | A1* | 11/2013 | Zhao | ............... C03B 23/245 65/152 |
| 2014/0048530 | A1* | 2/2014 | Li | ................. E06B 3/6612 219/615 |
| 2015/0218042 | A1* | 8/2015 | Hogan | ................. C03C 8/24 156/109 |
| 2015/0300077 | A1* | 10/2015 | Veerasamy | ........ E06B 3/6612 428/34 |

\* cited by examiner

METHODS FOR MANUFACTURING TEMPERED VACUUM GLASS AND PRODUCTION LINES THEREFOR

CLAIM FOR PRIORITY

This application is a U.S. national phase entry under 35 U.S.C. § 371 from PCT International Application No. PCT/CN2016/095523 filed on Aug. 16, 2016, which is based upon and claims the benefit of priority from the prior Chinese Patent Application No. 201510940006.1 filed on Dec. 15, 2015. The entire contents of the above applications are incorporated herein by reference.

TECHNICAL FIELD

The present disclosure relates to the manufacturing field of vacuum glass, and particularly relates to a manufacturing method of one type of tempered vacuum glass and a tempered vacuum glass production line based on the manufacturing method.

BACKGROUND ART

Vacuum glass with excellent heat insulation, sound insulation and energy-saving effects represents the development direction of future new-generation energy-saving architectural glass, and is increasingly widely popularized and used. Vacuum glass was first researched in the 1990s, for example, Australian Patent No. AU94192667.2 disclosed a manufacturing method of vacuum glass, which opened the door to vacuum glass research. Soon afterwards, some research had been made around this technology at home and abroad, but due to the process reasons, the manufactured vacuum glass was non-tempered vacuum glass, which did not meet the standards of architectural safety glass and greatly obstructed the application of vacuum glass in high-rise buildings and some special occasions. How to manufacture tempered vacuum glass becomes the focus of research at home and abroad. Based on these, the applicant proposed a glass plate combination sealing method in Chinese invention patent No. 201010508421.7, wherein sealing the circumference of vacuum glass with low melting point metal successfully solves the worldwide problem that other sealing processes may easily cause degradation of tempered glass substrates, realizes processing and manufacturing of tempered vacuum glass, and propels forward development and wide application of vacuum glass.

When the tempered vacuum glass is manufactured, the basic sealing strength of two pieces of glass is an important performance parameter of the tempered vacuum glass. Continuously breaking through the existing technical barriers, providing better solutions and propelling the development of tempered vacuum glass industry are goals continuously pursued by those skilled in the art. Therefore, how to improve the sealing strength is a goal continuously explored by those skilled in the art.

DISCLOSURE CONTENTS

In practical application, the applicant discovers that stress is produced after cooling solidification due to different expansion coefficients of a solder and a metalized layer during sealing. Aiming at the problems of the prior art, one of the aims of the present disclosure is to provide a manufacturing method of tempered vacuum glass, which is suitable for manufacturing tempered vacuum glass without an extraction opening, can greatly reduce the stress when two glass substrates are sealed and increase the connection strength, and implements exhaustion within a temperature range to achieve high exhaust efficiency and better exhaust effect, obtain vacuum glass with high vacuum degree and prolong the service life of the vacuum glass; and the second aim of the present disclosure is to provide a continuous and automatic production line of tempered vacuum glass, which provides equipment ensurance for batch production.

In order to achieve the above goals, the present disclosure discloses a manufacturing method of tempered vacuum glass, which includes the following steps:

(1) manufacturing metalized layers on the to-be-sealed areas of the said glass substrates, and performing tempering or thermal enhancement on the glass substrates;

(2) placing a metal solder on the metalized layers;

(3) preheating and superposing the glass substrates by adopting one of the following methods:

a, heating the two glass substrates to 60-230° C. respectively, then setting the metalized layers of the to-be-sealed areas of the two glass substrates oppositely, and superposing the glass substrates, so that the metal solder is positioned between the metalized layers of the to-be-sealed areas; or b, setting the metalized layers of the to-be-sealed areas of the two glass substrates oppositely, superposing the glass substrates so that the metal solder is positioned between the metalized layers of the to-be-sealed areas, and then heating the two superposed glass substrates as a whole to 60-230° C.;

(4) continuously heating the tempered glass assembly in a vacuum chamber to keep the tempered glass assembly within the heating temperature range of step (3), and vacuumizing the vacuum chamber to a preset vacuum degree; and (5) hermetically sealing the metalized layers in the vacuum chamber by adopting a metal brazing process, thus accomplishing the manufacturing process of the vacuum glass.

Further, the heating temperature in step (3) is 80-180° C.

Further, when the glass substrates are coated glass substrates, the to-be-sealed areas of the coated glass substrates are decoated before the metalized layers are prefabricated.

Further, in step (1), it further includes a step of manufacturing a support for supporting the inner cavity, that is, firstly, printing on a preset position of one glass substrate with pasty glass glaze to form an array of raised dots; and then, sintering the glass glaze into the support solidified with the glass substrate together by a high-temperature sintering process.

Further, the method further includes a step of placing the support before the two glass substrates are superposed, namely, placing the solid support at the preset position of one glass substrate.

Further, in step (6), the to-be-sealed areas are partially heated by adopting the metal brazing process in a laser heating, flame heating, electric current heating, induction heating, microwave heating, radiation heating or convection heating mode.

Further, in step (5), a spacer is arranged between the two glass substrates, so that a gap for extracting gas is reserved between the superposed glass substrates; and after the vacuum chamber reaches the preset vacuum degree, the spacer is removed.

Further, a getter is placed on at least one of the glass substrates before step (3), and the getter is activated after step (4) is completed.

A tempered vacuum glass production line based on the above manufacturing method includes a metalized layer manufacturing device, a solder placing device, a superposing device, a first preheating device, a vacuumizing system and soldering and edge-sealing devices, which are connected in sequence by a first conveying device, wherein the vacuumizing system includes a plurality of vacuum chambers provided with gas extracting devices and connected sequentially in the glass conveying direction, a second preheating device and a soldering and edge-sealing device are arranged in each vacuum chamber, and the tempered glass assembly is heated to 60-230° C. by the first preheating device and the second preheating device.

Further, each vacuum chamber includes a front auxiliary vacuum chamber arranged on the first conveying device and a main vacuum chamber positioned on one side of the first conveying device, and a vacuum valve is arranged between the front auxiliary vacuum chamber and the main vacuum chamber; the second preheating device and the soldering and edge-sealing device are positioned in the main vacuum chamber.

Further, when one vacuum chamber is equipped, the downstream side of the front auxiliary vacuum chamber is connected with a rear auxiliary vacuum chamber; when a plurality of vacuum chambers are equipped, the downstream side of the last front auxiliary vacuum chamber is connected with a rear auxiliary vacuum chamber.

Further, the superposing device includes a lifting mechanism arranged on one side of the first conveying device, the lifting mechanism is provided with a lifting arm, a turnover mechanism is arranged on the lifting arm, and the turnover mechanism is provided with a vacuum sucking disc or a clamping device; when the superposing device works, the vacuum sucking disc or the clamping device grabs the second glass substrate, the lifting mechanism lifts the second glass substrate to a preset height and then turns the second glass substrate over, and the turned second glass substrate is placed on the first glass substrate, thus accomplishing superposition.

Further, a second conveying device is arranged on the side of the first conveying device, the first conveying device is used for conveying the first glass substrate, and the second conveying device is used for conveying the second glass substrate.

Further, the superposing device includes a rotating shaft arranged between the first and the second conveying devices, the rotating shaft is connected with a swing arm inserted to a position below the second glass substrate along the gap of the second conveying device, and a vacuum sucking disc or a clamping device is arranged on the swing arm; when the superposing device works, the vacuum sucking disc or the clamping device grabs the second glass substrate, the swing arm is turned over around the rotating shaft, and the second glass substrate is placed on the first glass substrate on the first conveying device, thus accomplishing superposition.

Further, the superposing device includes a hanging transmission device arranged above the first conveying device, the hanging transmission device is used for conveying the second glass substrate and includes a transmission mechanism, and the transmission mechanism is provided with a lifting device with a vacuum sucking disc or a clamping mechanism; when the superposing device works, the lifting device descends, the vacuum sucking disc or the clamping mechanism grabs and fixes the second glass substrate on the first conveying device, then the lifting device ascends, the second glass substrate is conveyed to a position above the first glass substrate to be superposed, and the second glass substrate is placed on the first glass substrate, thus accomplishing superposition.

Further, the superposing device includes a multi-degree-of-freedom manipulator arranged on one side of the first conveying device, and the manipulator is provided with a vacuum sucking disc or a clamping device; when the superposing device works, the vacuum sucking disc or the clamping device grabs the second glass substrate, and the second glass substrate is turned over and then placed on the first glass substrate, thus accomplishing superposition.

Further, the production line is provided with a support placing device, which is arranged on a station between the metalized layer manufacturing device and the soldering and edge-sealing device.

Further, the production line is provided with a support placing device, which is arranged on a station between the solder placing device and the superposing device.

Further, the production line includes a support manufacturing device arranged between the metalized layer manufacturing device and the solder placing device, and the support manufacturing device includes a screen printing device, a drying device and a sintering device.

Further, when the glass substrates are coated glass substrates, the production line further includes a decoating device for decoating the to-be-sealed areas of the coated glass substrates.

Further, the soldering and edge-sealing device is one of a laser heating device, a microwave heating device, a flame heating device, an induction heating device or a convection heating device.

Further, the production line includes a glass tempering device, which is arranged on a station between the metalized layer manufacturing device and the solder placing device.

Further, the metalized layer manufacturing device includes a screen printing device, a drying device and a sintering device.

Further, the production line includes a getter activating device arranged in the vacuum chamber.

Further, when a plurality of vacuum chambers are equipped, the vacuum chambers are connected sequentially in the glass conveying direction.

Further, the vacuum chambers include a front auxiliary vacuum chamber, a main vacuum chamber and a rear auxiliary vacuum chamber connected sequentially in the glass conveying direction; the second preheating device and the soldering and edge-sealing device are positioned in the main vacuum chamber.

The manufacturing method of tempered vacuum glass in the present disclosure is suitable for manufacturing tempered vacuum glass without an extraction opening, the glass substrates are heated to 60-230° C. before sealing and then subject to edge sealing through brazing, so that the stress when the two glass substrates are sealed can be greatly reduced, and the connection strength can be increased; moreover, gas is exhausted within the temperature range, so that the exhaust efficiency is high, and the exhaust effect is better, vacuum glass with high vacuum degree can be obtained, and the service life of the vacuum glass is prolonged. In addition, the present disclosure further discloses a tempered vacuum glass production line based on the manufacturing method.

DETAILED DESCRIPTION

The specific embodiments of the present disclosure will be described in detail below in combination with the accompanying drawings.

Embodiment 1

Figure 1:
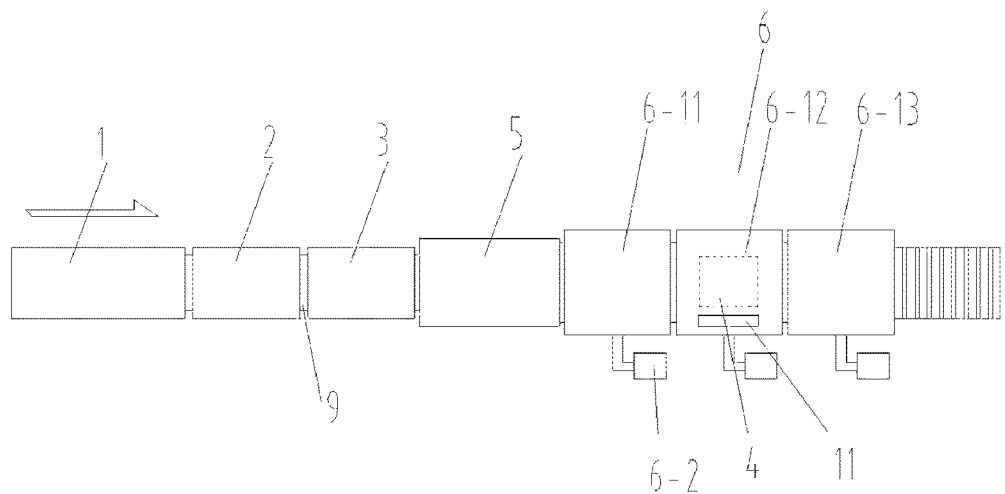
FIG. 1 is a schematic diagram of embodiment 1 of the present disclosure.
Figure 9:
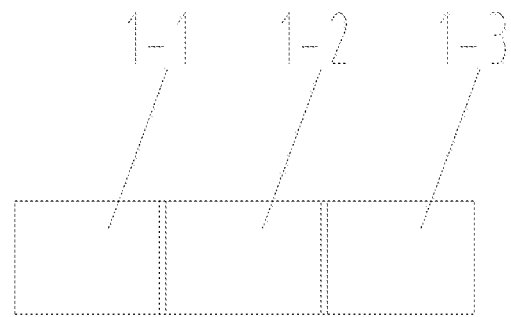
FIG. 9 is a schematic diagram of a metalized layer manufacturing device 1.

FIG. 1 and FIG. 9 show a first specific embodiment of a tempered vacuum glass production line in the present disclosure. In this embodiment, the production line specifically includes a first conveying device 9, e.g., a conveying roller bed, and a metalized layer manufacturing device 1, a solder placing device 2, a superposing device 3, a first preheating device 5 and a vacuumizing system 6 which are connected in sequence by the first conveying device 9, wherein the vacuumizing system 6 includes a plurality of vacuum chambers provided with gas extracting devices 6-2 and connected sequentially in the glass conveying direction, a second preheating device 11 and a soldering and edge-sealing device 4 are arranged in each vacuum chamber, and the tempered glass assembly is heated to 60-230° C. by the first preheating device 5 and the second preheating devices 11. Each vacuum chamber includes a front auxiliary vacuum chamber 6-11, a main vacuum chamber 6-12 and a rear auxiliary vacuum chamber 6-13 connected sequentially in the glass conveying direction; the second preheating device 11 and the soldering and edge-sealing device 4 are positioned in the main vacuum chamber 6-12. A vacuum valve is arranged at each of the inlet ends and the outlet ends of the front auxiliary vacuum chamber 6-11, the main vacuum chamber 6-12 and the rear auxiliary vacuum chamber 6-13, and a getter activating device is further arranged in the main vacuum chamber 6-12.

The metalized layer manufacturing device 1 includes a screen printing device 1-1, a drying device 1-2 and a sintering device 1-3. The drying device 1-2 and the sintering device 1-3 form an integrated device. The sintering device 1-3 is a glass tempering device.

The first preheating device 5 is a radiation type glass plate heating furnace or a convection type glass plate heating furnace.

The tempered vacuum glass includes two glass substrates. The method for manufacturing the tempered vacuum glass on the production line of embodiment 1 includes the following steps:

Step (1): On four edges of the surface of the glass substrates are to-be-sealed banded areas, metalized layers are manufactured on the to-be-sealed areas by the metalized layer manufacturing device 1, and the glass substrates are tempered or thermally enhanced; the detailed steps of manufacturing the metalized layers have been disclosed in previous patent application of the applicant, and will not be redundantly described herein.

Step (2): a metal solder is placed on the metalized layers by the solder placing device 2.

Step (3): the glass substrates are preheated and superposed by adopting one of the following methods:

a, firstly, the two glass substrates are heated to 60-230° C. respectively by the first preheating device 5, then the metalized layers of the two glass substrates are set oppositely by the superposing device 3, and the glass substrates are superposed, so that the metal solder is positioned between the metalized layers; for the superposing device 3, reference may be made to Chinese invention patent No. 201420110435.7; the superposing device 3 mainly includes a lifting mechanism arranged on one side of the conveying device, e.g., a chain wheel lifting mechanism, a servo piston cylinder lifting mechanism or the like, the lifting mechanism is provided with a lifting arm inserted into a roller gap to a position below the upper glass substrate, a turnover mechanism is arranged on the lifting arm, and the turnover mechanism is provided with a vacuum sucking disc; when it works, the vacuum sucking disc grabs the upper glass substrate that passes by, the lifting mechanism lifts the upper glass substrate to a preset height and then turns the upper glass substrate over, and the turned glass substrate is placed on the lower glass substrate, thus accomplishing superposition;

b, firstly, the metalized layers of the two glass substrates are set oppositely by the superposing device 3, and the glass substrates are superposed, so that the metal solder is positioned between the metalized layers; and then the two superposed glass substrates are overall heated to 60-230° C. by the first preheating device 5.

Step (4): the tempered glass assembly is continuously heated in the vacuum chamber to be kept within the heating temperature range of step (3), and the vacuum chamber is vacuumized to a preset vacuum degree, e.g., $10^{-2}$-$10^{-4}$ Pa; an ultraviolet cleaning device or a plasma bombardment device acts on the tempered glass assembly during vacuumizing to decompose residual impurities in the inner cavity, and volatile gas generated after decomposing is extracted from the inner cavity.

Step (5): the metal solder is heated in the main vacuum chamber 6-12 by using the soldering and edge-sealing device 4 and a metal brazing process, so that the metal solder is melted and solidified to hermetically seal the metalized layers of the two glass substrates, and the manufacturing process of the vacuum glass is accomplished. The to-be-sealed areas are partially heated by adopting the metal brazing process in a laser heating, flame heating, electric current heating, induction heating, microwave heating, radiation heating or convection heating mode. The soldering and edge-sealing device 4 is one of a laser heating device, a microwave heating device, a flame heating device, an induction heating device or a convection heating device.

According to the manufacturing method of the present disclosure, heating the glass substrates to 60-230° C. before the tempered glass assembly enters the vacuum chamber and maintaining the temperature after the tempered glass assembly enters the vacuum chamber are important process parameters obtained by the applicant in the process of continuously improving the manufacturing process of tempered vacuum glass in combination with a large volume of experimental data. Wherein heating the glass substrates before the tempered glass assembly enters the vacuum chamber can greatly reduce the heating time after the glass substrates enter the vacuum chamber, as the heating efficiency in the atmospheric environment is higher than that in the vacuum environment. Maintaining the above temperature in the exhaust process after the tempered glass assembly enters the vacuum chamber can improve the exhaust efficiency and the exhaust effect, hence improve the production efficiency and the product quality of vacuum glass and prolong the service life of the vacuum glass. FIGS. 1a-1j illustrate charts showing the influence of different heating temperatures on the exhaust efficiency and the exhaust effect.

It can be seen from the above curves that with the rise of the heating temperature, the vacuum degree is continuously increased, and the exhaust efficiency is also improved; when the glass substrates are heated to about 150° C., the vacuum degree declines abruptly, which indicates that the exhaust reaches its peak; when the temperature is continuously maintained at 150° C., the vacuum degree is quickly increased again, and the vacuum degree reaches a preset value after a period of time and remains stable, so that the tempered vacuum glass with high vacuum degree and stable performance can be obtained. However, for the lead-free metal solder, which has a relatively high melting point (about 230° C.), the heating temperature may be raised to 230° C.

Preferably, the glass substrates are heated to 80-180° C., so that the following sealing process is not affected, and the exhaust efficiency can be improved.

When the glass substrates are coated glass substrates, the to-be-sealed areas of the coated glass substrates are decoated before the metalized layers are manufactured. During decoating, the production line further includes a decoating device. The decoating device may also be separated from the production line, and decoating acts as a pretreatment process before entering the production line.

A getter is placed on at least one of the glass substrates before step (3), and the getter is activated after step (4) is completed.

Embodiment 2

Figure 2:
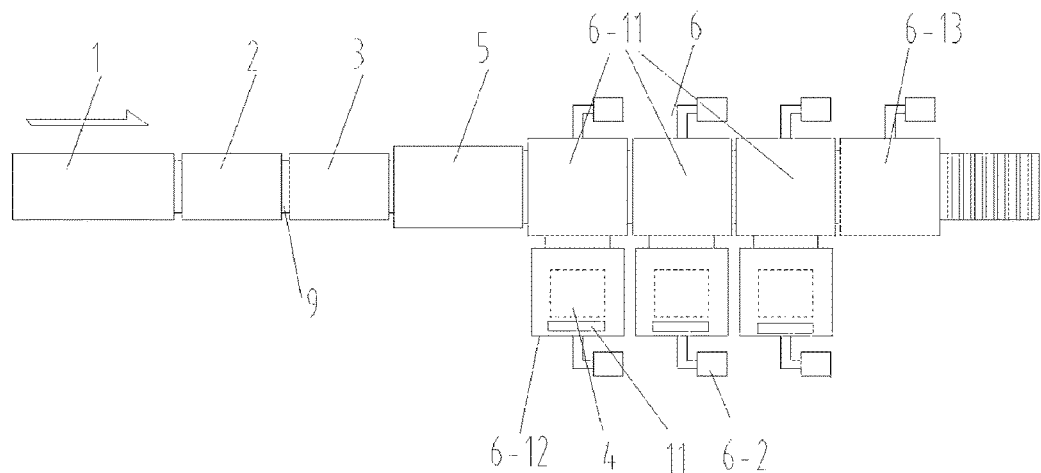
FIG. 2 is a schematic diagram of embodiment 2 of the present disclosure.

FIG. 2 shows a second specific embodiment of a tempered glass production line. This embodiment is substantially the same as embodiment 1 in structure, and the difference lies in that a plurality of vacuum chambers are simultaneously equipped on the production line, each vacuum chamber includes a front auxiliary vacuum chamber 6-11 arranged on the first conveying device 9 and a main vacuum chamber 6-12 positioned on one side of the first conveying device 9, and a vacuum valve is arranged between the front auxiliary vacuum chamber 6-11 and the main vacuum chamber 6-12; the second preheating device 11 and the soldering and edge-sealing device 4 are positioned in the main vacuum chamber 6-12, and the downstream side of the last front auxiliary vacuum chamber 6-11 is connected with a rear auxiliary vacuum chamber 6-13.

Embodiment 3

Figure 3:
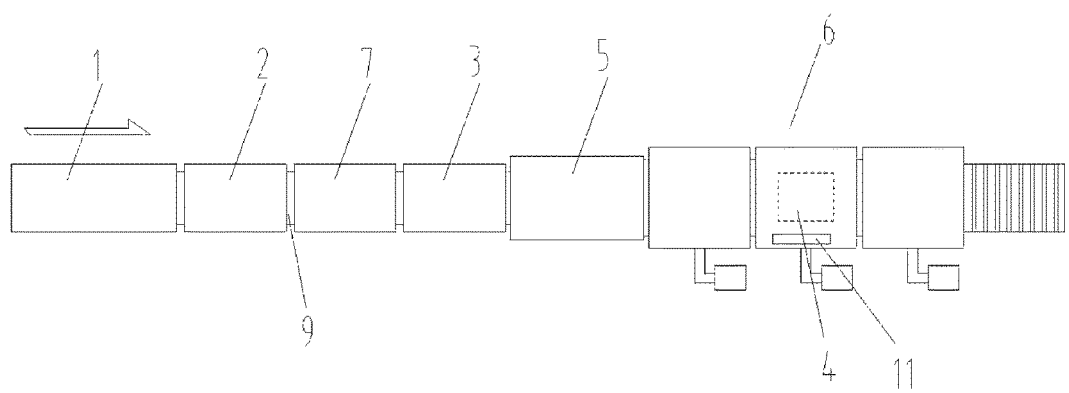
FIG. 3 is a schematic diagram of embodiment 3 of the present disclosure.
Figure 1A:
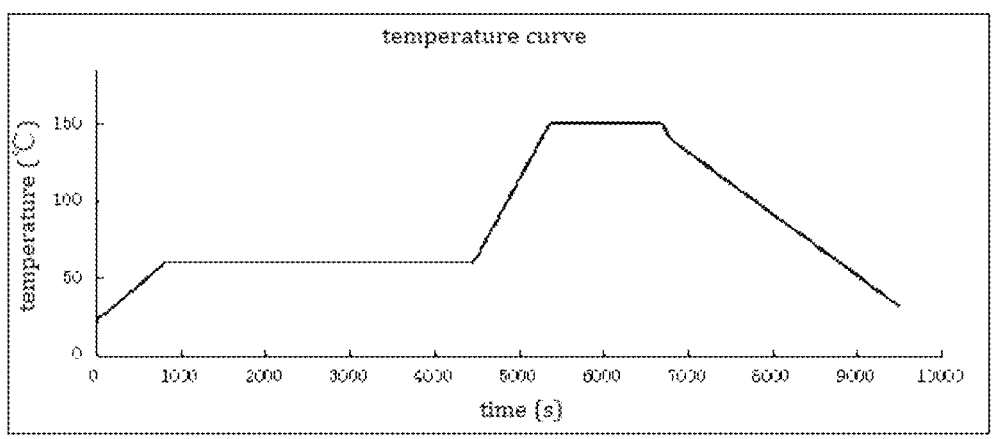
FIGS. 1a, 1b, 1c, 1d, 1e, 1f, 1g, 1h, 1i, and 1j illustrate charts showing the influence of different heating temperatures on the exhaust efficiency and the exhaust effect.
Figure 1B:
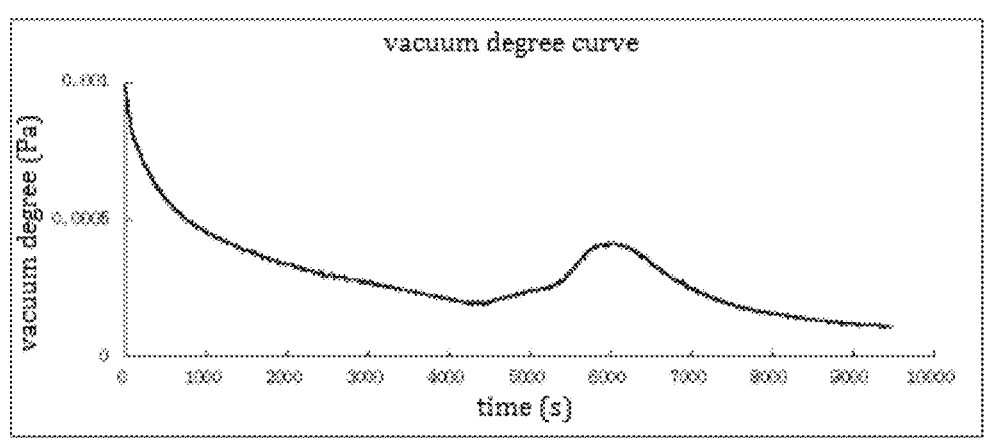
Figure 1C:
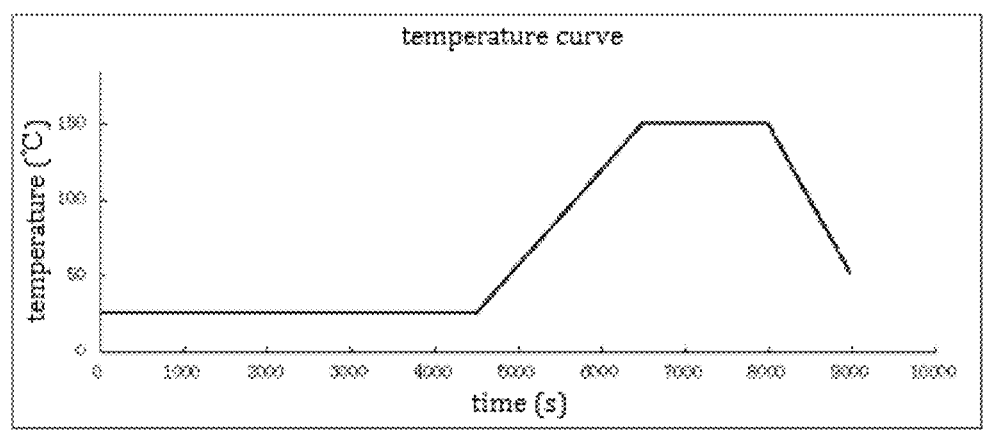
Figure 1D:
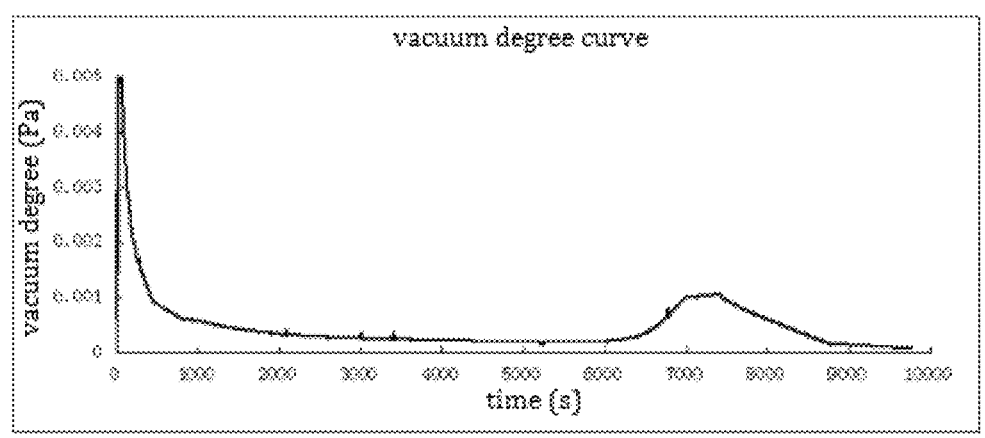
Figure 1E:
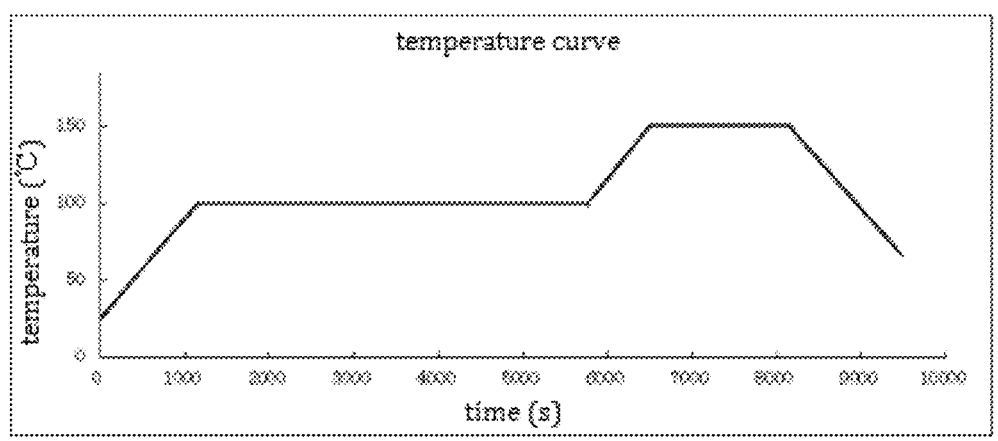
Figure 1F:
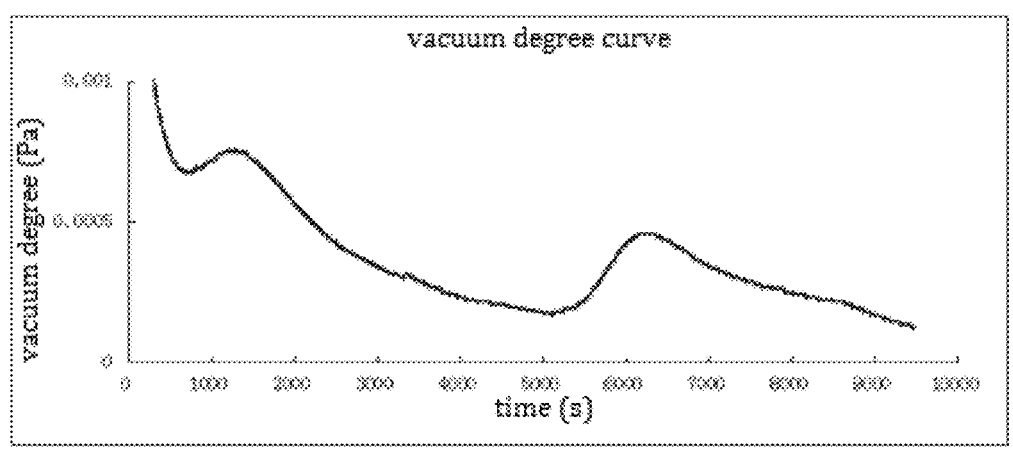
Figure 1G:
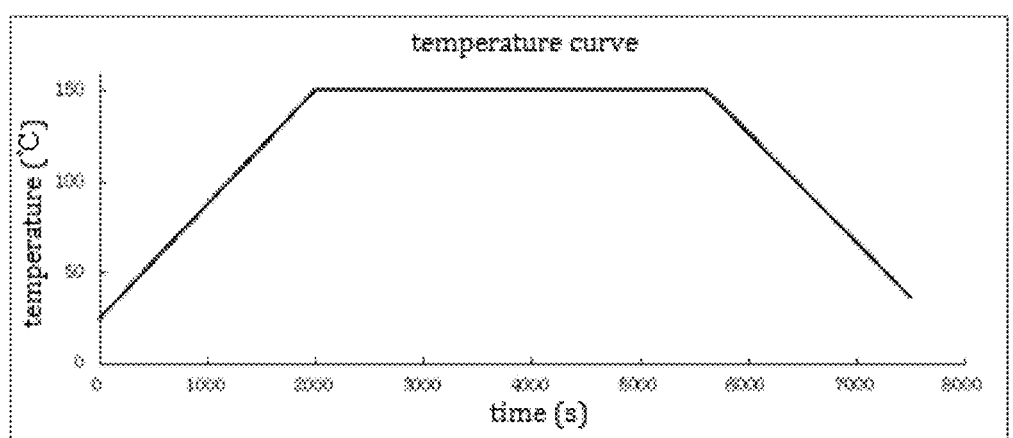
Figure 1H:
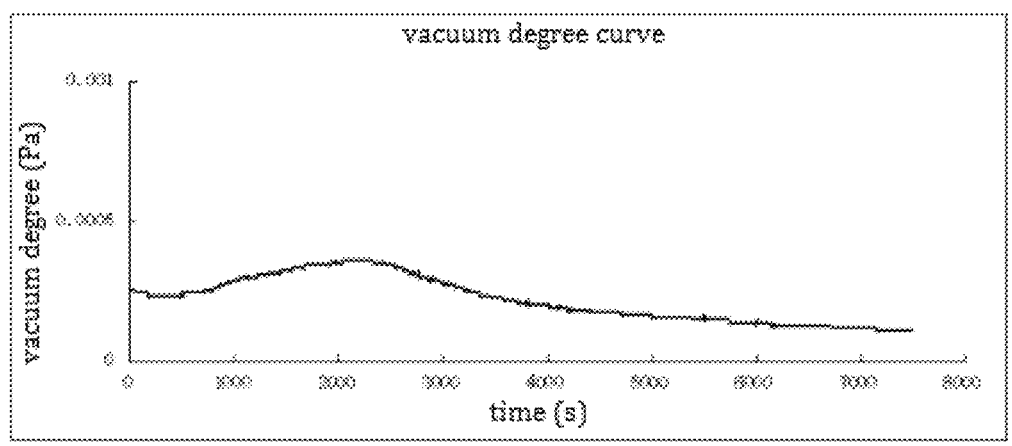
Figure 1I:
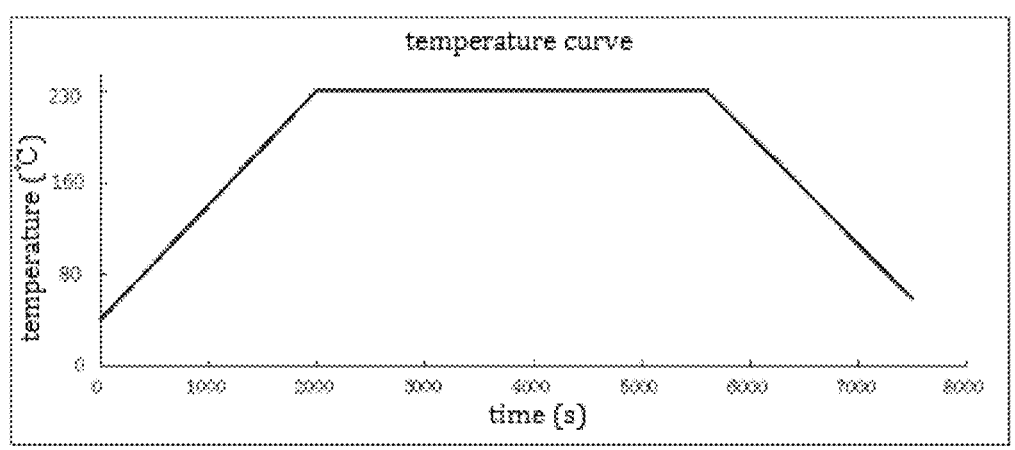
Figure 1J:
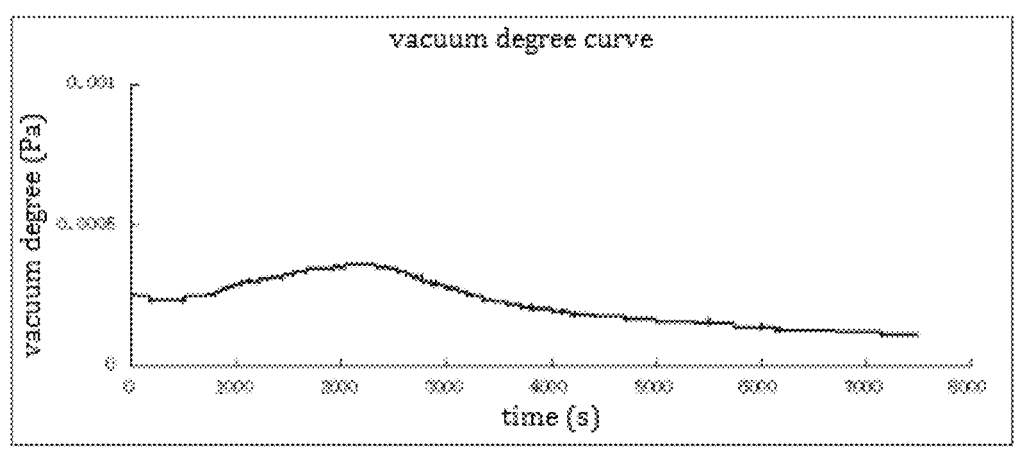

FIG. 3 shows a third specific embodiment of a tempered glass production line. This embodiment is substantially the same as embodiment 1 in structure, and the difference lies in that a support placing device 7 is arranged on a station between the solder placing device 2 and the superposing device 3, and is used for placing the premanufactured middle support on the glass substrate. Of course, the support placing device 7 may also be arranged on a station between the metalized layer manufacturing device 1 and the solder placing device 2.

Embodiment 4

Figure 4:
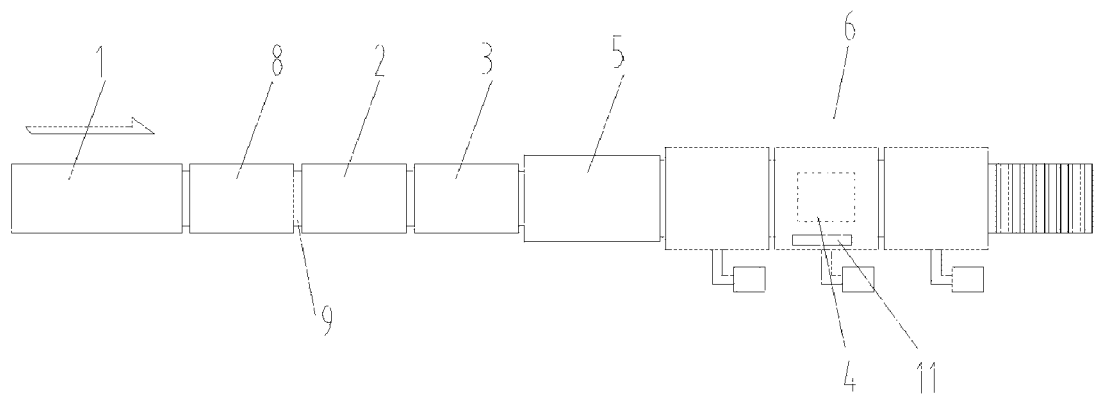
FIG. 4 is a schematic diagram of embodiment 4 of the present disclosure.
Figure 10:
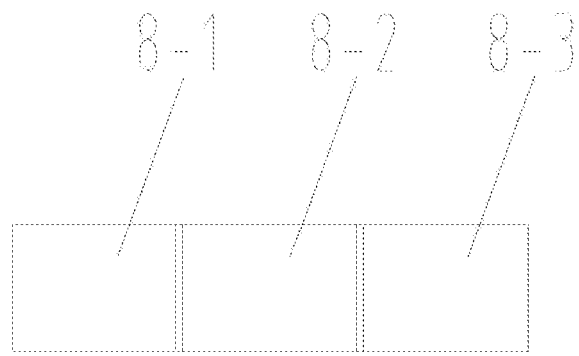
FIG. 10 is a schematic diagram of a support manufacturing device 8.

FIG. 4 and FIG. 10 show a fourth specific embodiment of a tempered glass production line. This embodiment is substantially the same as embodiment 1 in structure, and the difference lies in that a support manufacturing device 8 is arranged between the metalized layer manufacturing device 1 and the solder placing device 2; the support manufacturing device 8 includes a screen printing device 8-1, a drying device 8-2 and a sintering device 8-3; the drying device 8-2 and the sintering device 8-3 form an integrated device; and the sintering device 8-3 is a glass tempering device. The support manufacturing device 8 manufactures a middle support in the following steps: firstly, printing on a preset position of one glass substrate with pasty glass glaze to form an array of raised dots by using the screen printing device 8-1; and then, sintering the glass glaze into the support solidified with the glass substrate together through a high-temperature sintering process by using the drying device 8-2 and the sintering device 8-3.

Embodiment 5

Figure 5:
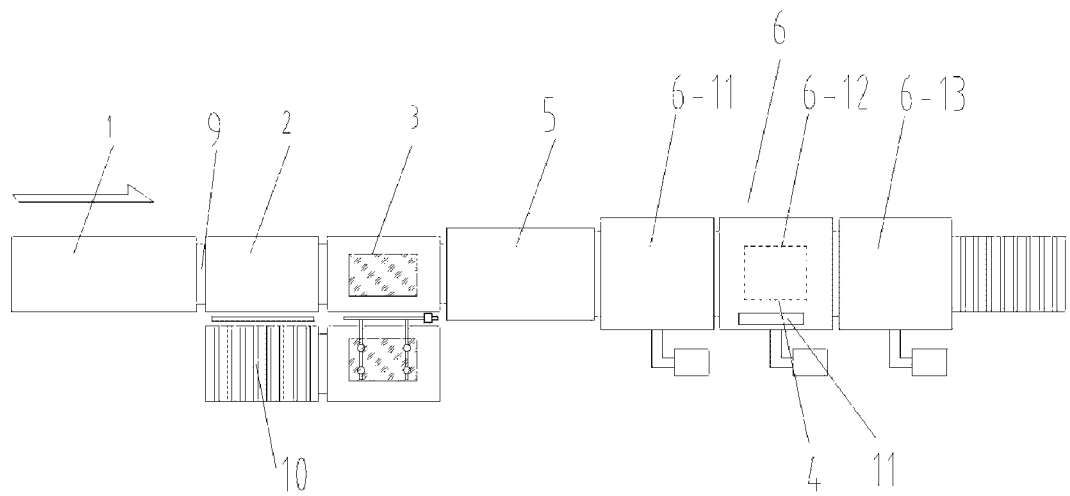
FIG. 5 is a schematic diagram of embodiment 5 of the present disclosure.
Figure 6:
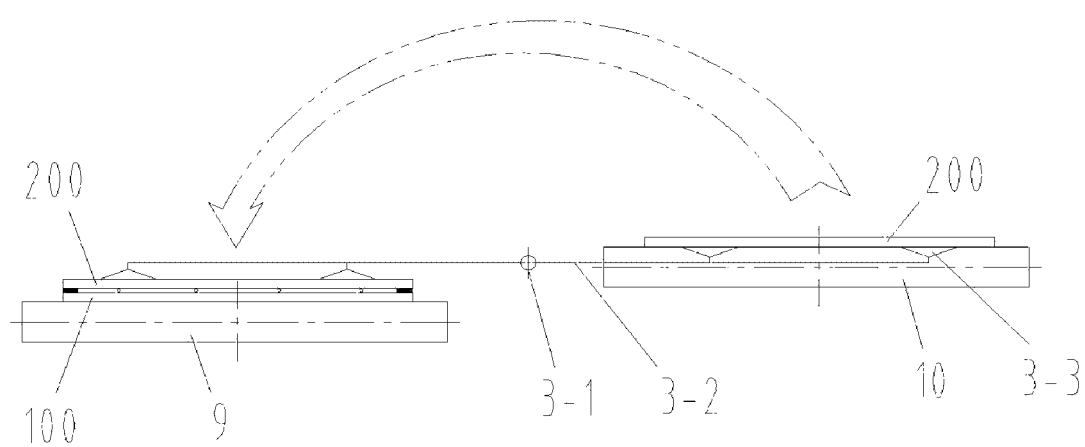
FIG. 6 is a superposing schematic diagram of the superposing device 3 in FIG. 5.

FIG. 5 and FIG. 6 show a fifth specific embodiment of a tempered glass production line. This embodiment is substantially the same as embodiment 1 in structure, and the difference lies in that a second conveying device 10, e.g., a conveying roller bed, is arranged on the side of the first conveying device 9, the first conveying device 9 is used for conveying the first glass substrate 100, and the second conveying device 10 is used for conveying the second glass substrate 200. The superposing device 3 includes a rotating shaft 3-1 arranged between the first and the second conveying devices 9 and 10, the rotating shaft 3-1 is connected with a swing arm 3-2 inserted to a position below the second glass substrate 200 along the gap of the second conveying device 10, and a vacuum sucking disc 3-3 or a clamping device is arranged on the swing arm 3-2; when the superposing device 3 works, the vacuum sucking disc 3-3 or the clamping device grabs the second glass substrate 200, the swing arm 3-2 is turned over around the rotating shaft 3-1, and the second glass substrate 200 is placed on the first glass substrate 100 on the first conveying device 9, thus accomplishing superposition.

Embodiment 6

Figure 7:
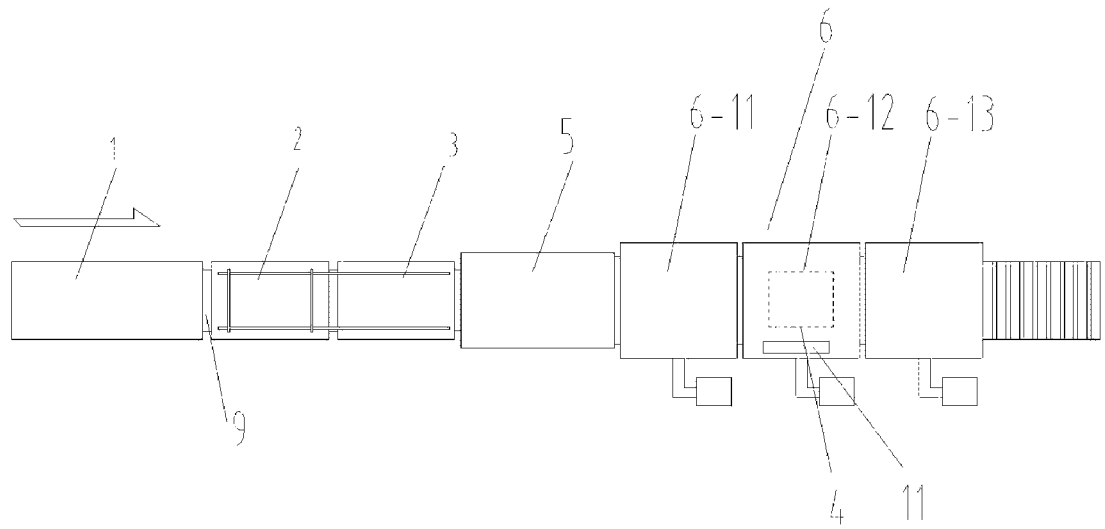
FIG. 7 is a schematic diagram of embodiment 6 of the present disclosure.
Figure 8:
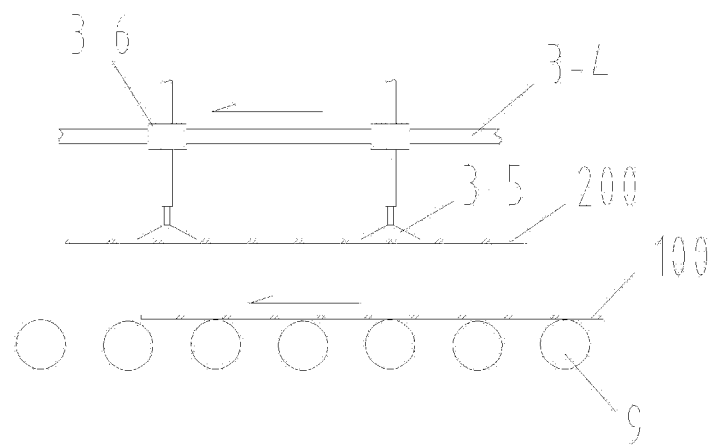
FIG. 8 is a superposing schematic diagram of the superposing device 3 in FIG. 7.

FIG. 7 and FIG. 8 show a sixth specific embodiment of a tempered glass production line. This embodiment is substantially the same as embodiment 1 in structure, and the difference lies in that the superposing device 3 includes a hanging transmission device arranged above the first conveying device 9, the hanging transmission device extends upstream and is connected with the station where the solder placing device 2 is located, the first conveying device 9 is used for conveying the first glass substrate 100, the hanging transmission device is used for conveying the second glass substrate 200 and includes a transmission mechanism 3-4, the transmission mechanism 3-4 is provided with a lifting device 3-6 with a vacuum sucking disc 3-5 or a clamping mechanism, and the lifting device 3-6 is a screw lifting mechanism or a cylinder or the like; when the superposing device 3 works, the lifting device 3-6 descends, the vacuum sucking disc 3-5 or the clamping mechanism grabs and fixes the second glass substrate 200 on the first conveying device 9 and in the station where the solder placing device 2 is located, then the lifting device 3-6 ascends, the second glass substrate 200 is conveyed to a position above the first glass substrate 100 to be superposed, and the second glass substrate 200 is placed on the first glass substrate 100, thus accomplishing superposition.

Of course, the superposing device 3 may also be a multi-degree-of-freedom manipulator arranged on one side of the first conveying device 9, and the manipulator accomplishes superposition.

The above examples are merely used for describing the present disclosure. The embodiments of the present disclosure are not limited to these examples. Various specific embodiments made in accordance with the thought of the present disclosure by those skilled in the art shall fall into the protection scope of the present disclosure.

What is claimed is:

1. A production line for manufacturing tempered vacuum glass, comprising:
    a first conveying device to convey glass substrates in the production line;
    a metalized layer manufacturing device to manufacture metalized layers on to-be-sealed areas of the glass substrates and perform tempering or thermal enhancement on the glass substrates;
    a solder placing device to place a metal solder on the metalized layers;
    a superposing device and a first preheating device, to preheat and superpose the glass substrates through one of:
        (a) heating by the first preheating device the two glass substrates to 60-230° C. respectively, setting the metalized layers of the to-be-sealed areas of the two glass substrates oppositely, and superposing by the superposing device the glass substrates, so that the metal solder is positioned between the metalized layers of the to-be-sealed areas, or
        (b) setting the metalized layers of the to-be-sealed areas of the two glass substrates oppositely, superposing by the superposing device the glass substrates so that the metal solder is positioned between the metalized layers of the to-be-sealed areas, and heating by the first preheating device the two superposed glass substrates to 60-230° C.;
    a vacuumizing system, comprising one or more vacuum chambers including a gas extracting device and a second preheating device, to continuously heat the superposed glass substrates in the vacuum chamber to keep the superposed glass substrates within the heating temperature range of 60-230° C., and vacuumize the vacuum chamber to a preset vacuum degree; and
    a soldering and edge-sealing device, arranged in at least one of the vacuum chambers, to hermetically seal the metalized layers of the superposed glass substrates in the vacuum chamber by adopting a metal brazing process;
    wherein each of the one or more vacuum chambers comprises:
        a front auxiliary vacuum chamber arranged on the first conveying device; and
        a main vacuum chamber positioned on one side of the first conveying device;
    wherein
        a vacuum valve is arranged between the front auxiliary vacuum chamber and the main vacuum chamber, and
        the second preheating device and the soldering and the edge-sealing device are positioned in the main vacuum chamber.

2. The tempered vacuum glass production line of claim 1, wherein:
    when only one vacuum chamber is equipped, a downstream side of the front auxiliary vacuum chamber is connected with a rear auxiliary vacuum chamber; and
    when a plurality of vacuum chambers are equipped, a downstream side of a front auxiliary vacuum chamber of the last vacuum chamber in the sequence is connected with a rear auxiliary vacuum chamber.

3. The tempered vacuum glass production line of claim 1, wherein the superposing device comprises:
    a lifting mechanism arranged on one side of the first conveying device;
    a lifting arm coupled to the lifting mechanism;
    a turnover mechanism arranged on the lifting arm; and
    a vacuum sucking disc or a clamping device is coupled to the turnover mechanism;
    wherein the superposing device superposing the glass substrates comprises:
        the vacuum sucking disc or the clamping device grabbing a second glass substrate,
        the lifting mechanism lifting the second glass substrate to a preset height and turning the second glass substrate over, and
        the turned second glass substrate being placed on a first glass substrate.

4. The tempered vacuum glass production line of claim 1, further comprising:
    a second conveying device arranged on a side of the first conveying device;
    wherein the first conveying device conveys a first glass substrate, and the second conveying device conveys a second glass substrate.

5. The tempered vacuum glass production line of claim 4, wherein the superposing device comprises;
    a rotating shaft arranged between the first and second conveying devices;
    a swing arm connected to the rotating shaft and inserted into a gap between the second glass substrate and the second conveying device; and
    a vacuum sucking disc or a clamping device arranged on the swing arm;
    wherein the superposing device superposing the glass substrates comprises:
        the vacuum sucking disc or the clamping device grabbing the second glass substrate,
        the swing arm being turned over around the rotating shaft, and
        the second glass substrate being placed on the first glass substrate on the first conveying device.

6. The tempered vacuum glass production line of claim 1, wherein the superposing device comprises:
    a hanging transmission device arranged above the first conveying device,
    wherein:
        the hanging transmission device transfers a second glass substrate and comprises a transmission mechanism; and the transmission mechanism is provided with a lifting device including a vacuum sucking disc or a clamping mechanism;

wherein the superposing device superposing the glass substrates comprises:
the lifting device descending,
the vacuum sucking disc or the clamping mechanism grabbing the second glass substrate from the first conveying device, and
the lifting device ascending and transferring the second glass substrate to a position above a first glass substrate, and placing the second glass substrate on the first glass substrate.

7. The tempered vacuum glass production line of claim 1, wherein the superposing device comprises:
a multi-degree-of-freedom manipulator arranged on one side of the first conveying device; and
a vacuum sucking disc or a clamping device coupled to the multi-degree-of-freedom manipulator;
wherein the superposing device superposing the glass substrates comprises:
the vacuum sucking disc or the clamping device grabbing a second glass substrate, and
the second glass substrate being turned over and then placed on a first glass substrate.

8. The tempered vacuum glass production line of claim 1, further comprising a support placing device, which is arranged on a station between the metalized layer manufacturing device and the soldering and edge-sealing device.

9. The tempered vacuum glass production line of claim 1, further comprising a support placing device, which is arranged on a station between the solder placing device and the superposing device.

10. The tempered vacuum glass production line of claim 1, further comprising:
a support manufacturing device arranged between the metalized layer manufacturing device and the solder placing device,
wherein the support manufacturing device comprises a screen printing device, a drying device and a sintering device.

11. The tempered vacuum glass production line of claim 1, further comprising a decoating device to decoat the to-be-sealed areas when the glass substrates are coated glass substrates.

12. The tempered vacuum glass production line of claim 1, wherein the soldering and edge-sealing device is one of a laser heating device, a microwave heating device, a flame heating device, an induction heating device or a convection heating device.

13. The tempered vacuum glass production line of claim 1, further comprising a glass tempering device, which is arranged on a station between the metalized layer manufacturing device and the solder placing device.

14. The tempered vacuum glass production line of claim 1, wherein the metalized layer manufacturing device comprises a screen printing device, a drying device and a sintering device.

15. The tempered vacuum glass production line of claim 1, further comprising a getter activating device arranged in the vacuum chamber.

16. The tempered vacuum glass production line of claim 1, wherein when a plurality of vacuum chambers are equipped, the vacuum chambers are connected sequentially along the glass conveying direction.

17. The tempered vacuum glass production line of claim 16, wherein each of the plurality of vacuum chambers comprises:
a front auxiliary vacuum chamber, a main vacuum chamber and a rear auxiliary vacuum chamber, connected sequentially along the glass conveying direction; and
the second preheating device and the soldering and edge-sealing device positioned in the main vacuum chamber.

* * * * *